(No Model.)  2 Sheets—Sheet 1.
F. W. BROWN.
MEANS FOR INSULATING, CARRYING, AND LAYING ELECTRIC WIRES.
No. 288,002.  Patented Nov. 6, 1883.
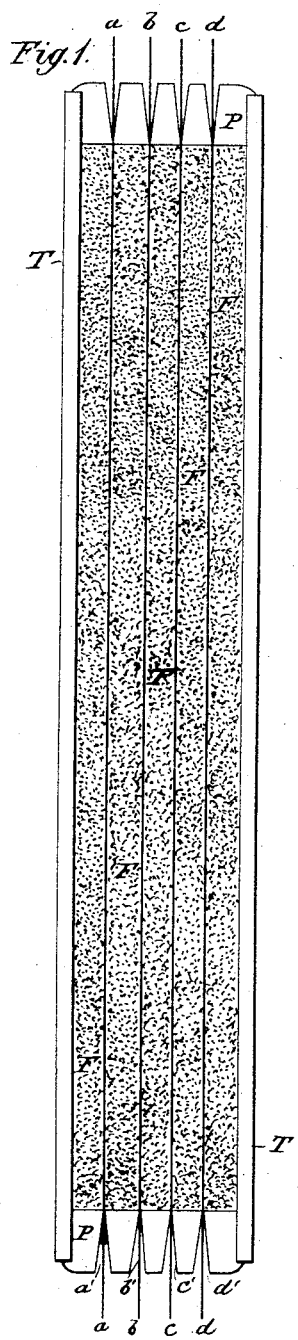
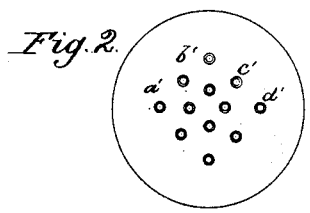
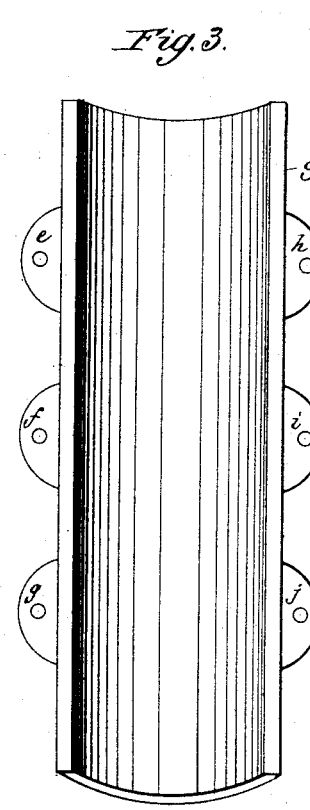
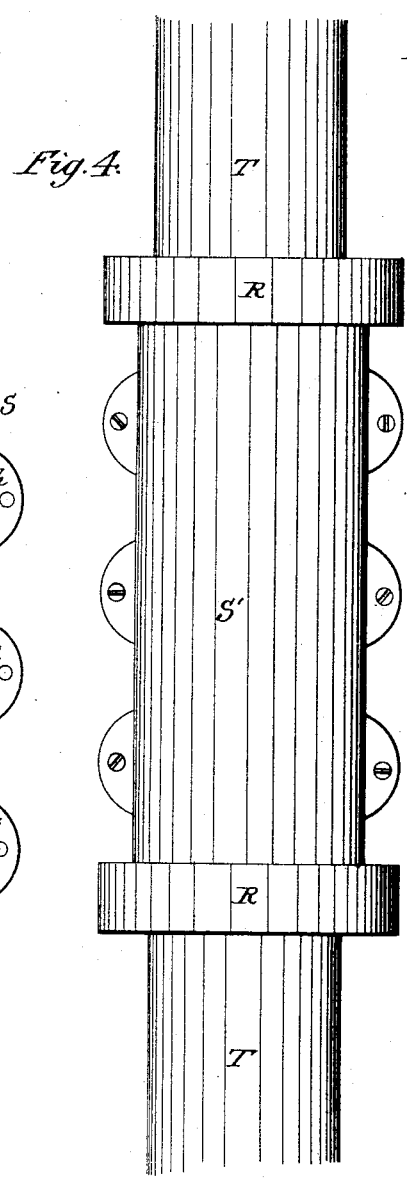
WITNESSES:
W. W. Hollingworth
Solon C. Kemon
INVENTOR:
F. W. Brown
BY Munn & Co.
ATTORNEYS.

(No Model.) 2 Sheets—Sheet 2.
F. W. BROWN.
MEANS FOR INSULATING, CARRYING, AND LAYING ELECTRIC WIRES
No. 288,002. Patented Nov. 6, 1883.
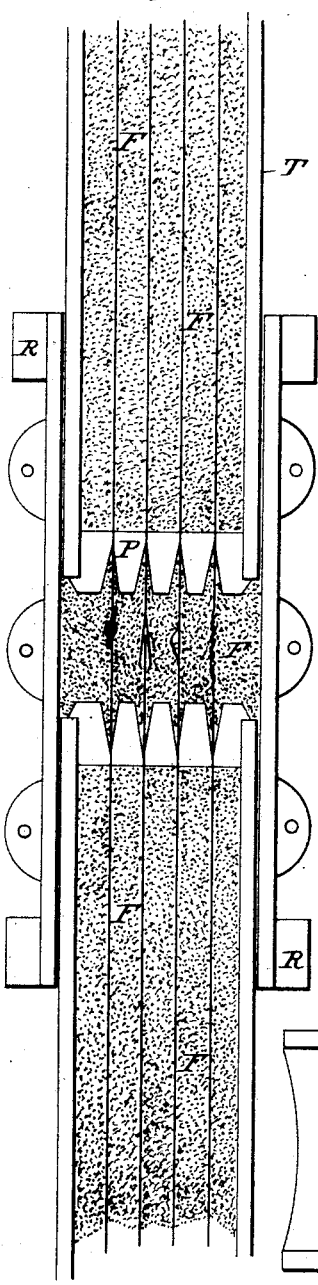
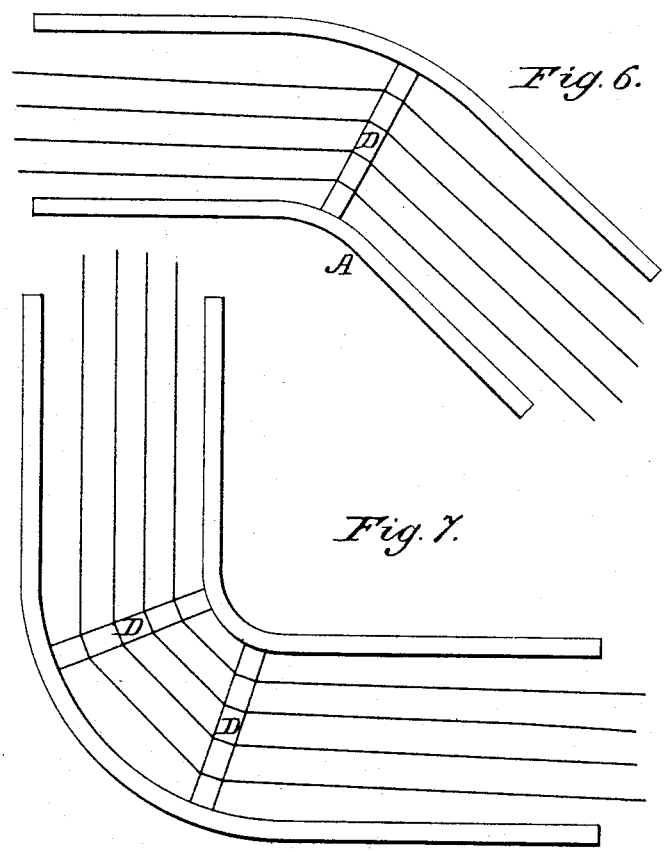
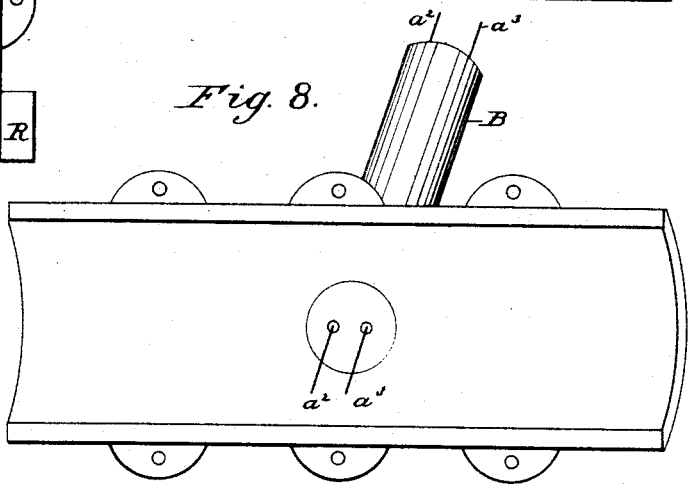
WITNESSES:
W. W. Hollingsworth
Solon C. Kemon
INVENTOR:
F. W. Brown
BY Munn & Co.
ATTORNEYS.

UNITED STATES PATENT OFFICE.

FRANCIS WAYLAND BROWN, OF ROCHESTER, NEW YORK.

MEANS FOR INSULATING, CARRYING, AND LAYING ELECTRIC WIRES.

SPECIFICATION forming part of Letters Patent No. 288,002, dated November 6, 1883.

Application filed June 6, 1882. (No model.)

*To all whom it may concern:*

Be it known that I, FRANCIS WAYLAND BROWN, a citizen of the United States, residing at Rochester, in the county of Monroe and State of New York, have invented certain new and useful Improvements in Means for Insulating, Carrying, and Laying Wires for Conducting Electricity; and I do hereby declare that the following is a full, clear, and exact description of the invention, which will enable others who are skilled in the art to which it appertains to make and use the same.

My invention relates to improvements in the means for insulating, carrying, and laying wires for conducting electricity; and it consists in the peculiar construction and arrangement of the parts, as hereinafter more fully set forth, and pointed out in the claim.

Figure 1 is a longitudinal section of a length of tubing, T T, containing any required number of wires, $a\ b\ c\ d$, &c., severally insulated and protected by the surrounding pulverized non-conducting filling F, the wires passing out at each end through the conical apertures in the non-conducting plugs P P, the wires being cemented in the plugs and the plugs cemented in the ends of the tubing, thus hermetically sealing the length.

Fig. 2 is a non-conducting plug pierced with the conical openings $a'\ b'\ c'\ d'$, &c., marked to correspond with the wires which pass through them, the openings being upon the inside just large enough to pass the wire, and upon the outside enough larger to receive the cement which fastens the wires to the plug.

Fig. 3 is a semi-cylindrical connection-piece, S, two of which, fastened together by screws at $e, f, g, h, i$, and $j$, form a pipe-like connection, S', for the successive lengths of pipe or tubing.

Fig. 4 shows the two connection-pieces in place and grasping the adjacent ends of the two lengths of tubing T T, all being cemented together and further strengthened by the two rings R R, slightly beveled on their inner surface, and which are tightly driven over the ends of the connection-pieces after they are screwed in place.

Fig. 5 represents the lower connection-piece in place, and shows the projecting ends of the corresponding wires connected by hooking, twisting, halving, soldering, &c., the space within the connection-piece and between the ends of the adjacent lengths of tubing being filled with powdered non-conducting filling in the same manner as the pipes themselves, and forming, when the two connection-pieces are screwed and cemented in place, a hermetically-sealed chamber, the wires therein being severally insulated and protected, as in the separate lengths of tubing.

Fig. 6 is an angle-pipe for changing the direction of the line, a short length of tubing being bent to the required angle at A, and the several wires kept in their proper positions by a non-conducting disk, D, properly perforated and slipped into place during the process of filling, the length being in all other respects like that shown in Fig. 1.

Fig. 7 is angle-pipe with a more abrupt change of direction, the wires being kept in place by two disks.

Fig. 8 is a branch connection-piece for making offsets from or connections with the main line, the side wires, $a^2\ a^3$, being introduced through the branch pipe B into the connection-chamber within, and there connected with the desired wire or wires of the main line, the connection being made in other respects as in Fig. 5.

As to the manner of constructing, the tubing or pipe may be of any suitable material. In most situations iron pipe, similar to gas-pipe, would be cheapest and most serviceable. The diameter would vary according to the number of wires to be conveyed. The thickness of the pipe would depend upon the risk or exposure of the situation. The lengths would vary according to the demand and the manufacturing facilities of the maker. The plugs may be of glass or any other non-conducting material impervious to moisture. They may be slightly conical or made with a flange, to prevent slipping into the pipe.

The wires, which may be increased to almost any desired number, are taken from as many different reels and passed through a plate with apertures marked to correspond with those in the plugs to be used. They are then passed through one of the plugs from the outer to the inner side, kept in their relative positions by any suitable device, passed through one of the lengths of pipe, and then through a second plug from the inner to the outer side. The first plug is then cemented and driven into position and the wires cemented into the conical openings in the plug. The wires are then drawn taut, to secure their separation throughout the length of pipe during the process of filling.

The filling may be sand and resin, or coal-dust, brick-dust, powdered clay, marl, gypsum, or any other non-conducting substance, powdered and sifted so as to closely fill the spaces between and around the wires, thus preventing their contact with each other or with the surrounding pipe, and insulating and protecting each wire. The filling may be done by a hot blast, which will insure dryness and destroy all animal or vegetable organisms. Powdered resin softened by a spray of paraffine, benzoin, turpentine, or melted beeswax, and added in small quantity to the sand, will form a particularly firm compound. By having the pipes heated while being filled they will, on cooling, compress the filling into a compact mass, so as to prevent any displacement of the wires by handling or bending the pipes. When the pipe is filled, the second plug is cemented, slipped along the wires into place, and driven down upon the filling, and the several wires are then cemented to the plug by filling the conical openings around them, thus hermetically sealing the tube. The wires are then cut at a short distance from each plug, and the length is ready for laying. The pipe may be painted with lead as a further security against dampness, or may be coated with tar or any other water-proof preparation.

In connecting the lengths together the pipes are placed in line and the adjacent ends brought near each other, leaving only what room is needed for connecting the correspondingly-numbered wires by hooking, twisting, halving, soldering, or any other convenient way. A strip of sheet-lead is then placed under the two ends, and the space between the under connection-piece cemented and put in place, the space within filled in the same manner as the pipes, the lead wrapped around and over the filling, the upper connection-piece cemented and put in place, the two parts screwed together, and the iron rings tightly driven over them at each end, thus forming a connection hermetically sealed and as strong as the pipe itself, the wires being insulated and protected within the connection-chamber as perfectly as within the tubing.

Changes of direction are easily made, as shown in Figs. 6 and 7, and offsets, as shown in Fig. 8. Connection may be made or changed at any time by simply opening a connection-chamber.

The line may be laid through water, under ground, or wherever desired. If through water, the joints or connections would be successively formed above the surface of the water and the line gradually submerged.

I am aware that telegraph-wires have heretofore been laid in tubes filled with a non-conducting material, and the ends of the tubes provided with perforated glass disks or other non-conducting material supporting the wires passing through the perforations in the glass disks, and I therefore lay no claim, broadly, to such construction.

Having fully described my invention, what I desire to claim and secure by Letters Patent is—

The combination, with the tubes T, the insulated wires $a\ b\ c\ d$, and non-conducting conical plugs P P, having conical openings $a'\ b'\ c'\ d'$, of the pipe S', formed of the two longitudinal halves S, each provided with side lugs having screw-holes and screws, by which the halves are joined together or separated, and rings R, substantially as shown and described.

FRANCIS WAYLAND BROWN.

Witnesses:
ARTHUR J. SHAW,
JOHN A. C. WRIGHT.